US009433306B2

(12) United States Patent
Rainis et al.

(10) Patent No.: US 9,433,306 B2
(45) Date of Patent: Sep. 6, 2016

(54) SUPPORT APPARATUS AND METHOD FOR A SLIDING FRAME

(75) Inventors: Dov Rainis, Herzlia (IL); Eliezer Ginzbourg, Ganey Tiqwa (IL)

(73) Assignee: SYNERON MEDICAL LTD., Yoqneam Illit (IL)

( * ) Notice: Subject to any disclaimer, the term of this patent is extended or adjusted under 35 U.S.C. 154(b) by 461 days.

(21) Appl. No.: 13/981,953

(22) PCT Filed: Dec. 29, 2011

(86) PCT No.: PCT/IL2011/000969
§ 371 (c)(1),
(2), (4) Date: Sep. 20, 2013

(87) PCT Pub. No.: WO2012/101624
PCT Pub. Date: Aug. 2, 2012

(65) Prior Publication Data

US 2014/0016885 A1 Jan. 16, 2014

Related U.S. Application Data

(60) Provisional application No. 61/436,293, filed on Jan. 26, 2011, provisional application No. 61/550,417, filed on Oct. 23, 2011.

(51) Int. Cl.
*H02K 7/09* (2006.01)
*A47F 5/00* (2006.01)
*E05D 15/06* (2006.01)

(52) U.S. Cl.
CPC ................ *A47F 5/00* (2013.01); *E05D 15/06* (2013.01); *E05D 15/0621* (2013.01); *E05D 2015/0695* (2013.01)

(58) Field of Classification Search
CPC ................................. H02K 7/08; H02K 7/09
USPC ................................. 310/90.5, 12.09, 12.31
See application file for complete search history.

(56) References Cited

U.S. PATENT DOCUMENTS 3,346,993 A 10/1967 Johnson
3,464,158 A * 9/1969 Greene .................... E06B 7/32
160/180
3,797,402 A 3/1974 Karch (Continued)

FOREIGN PATENT DOCUMENTS

EP 1 077 302 A2 2/2001
EP 1 217 160 A2 6/2002

(Continued)

*Primary Examiner* — Thanh Lam
(74) *Attorney, Agent, or Firm* — Vorys, Sater, Seymour and Pease LLP; William L. Klima

(57) ABSTRACT

Provided is a support apparatus for a sliding frame including a stationary portion having a long axis parallel to a plane defined by the frame and including one or more magnetic insert disposed along a long axis defining a path of translation and a movable portion attached to the frame, including at least one magnetic insert and movable along the path of translation and wherein the magnetic field vector orientation of the stationary portion magnetic inserts and of the movable portion magnetic inserts are the same, generate repelling forces and maintain a single state of contactless equilibrium between the stationary portion and the movable portion at any point throughout the path of translation regardless of the orientation of said plane.

19 Claims, 14 Drawing Sheets

(56) References Cited

U.S. PATENT DOCUMENTS

| | | | | |
|---|---|---|---|---|
| 4,208,755 | A * | 6/1980 | Shepherd | A47K 3/34 15/160 |
| 4,575,966 | A | 3/1986 | Gerritsen | |
| 4,698,876 | A | 10/1987 | Karita | |
| 5,194,309 | A * | 3/1993 | Knudsen | E06B 3/44 428/119 |
| 5,581,946 | A * | 12/1996 | Lin | E05C 19/001 49/368 |
| 5,712,516 | A | 1/1998 | Kabout | |
| 5,887,387 | A * | 3/1999 | Dallaire | E06B 7/26 49/408 |
| 6,289,643 | B1 | 9/2001 | Bonar | |
| 7,980,027 | B2 * | 7/2011 | Kraus | B60J 1/16 49/209 |
| 8,362,667 | B2 * | 1/2013 | Jin | H04M 1/0237 310/90.5 |
| 2004/0080225 | A1 * | 4/2004 | Takashima | B23Q 1/621 310/90.5 |
| 2006/0032395 | A1 | 2/2006 | Matuschek et al. | |
| 2008/0100152 | A1 | 5/2008 | Busch | |
| 2009/0044916 | A1 * | 2/2009 | Singiser | E05D 15/0682 160/201 |
| 2010/0225114 | A1 * | 9/2010 | Perner | F16C 32/0402 290/53 |

FOREIGN PATENT DOCUMENTS

| | | | |
|---|---|---|---|
| WO | 03/091132 | A2 | 11/2003 |
| WO | 2009/023083 | A1 | 2/2009 |

* cited by examiner

SUPPORT APPARATUS AND METHOD FOR A SLIDING FRAME

TECHNICAL FIELD

The present apparatus and method relate to sliding frame support apparatuses and more specifically to sliding frame magnetic support apparatuses.

BACKGROUND

Contrary to a hinged frame, such as that, for example, of a door or a window, which swings open about hinges, a sliding frame is a type of frame which commonly opens by sliding horizontally along, for example, a wall or into a pocket in a wall. Sliding frames are commonly either mounted on or suspended from a track employing a sliding frame gear mechanism.

Sliding gear mechanisms are commonly made of metal materials such as aluminum, plastic polymers or a combination of plastic polymers, such as Teflon®, that have a lower friction co-efficient than high density polyethylene and commonly include two basic types: the top hung mechanism, in which the frame is hung from a track by two trolley hangers or a bottom rolling mechanism. The top hung type sliding gear mechanism requires guides at the bottom of the frame to prevent lateral pendulous swinging of the frame. Such guides may include, for example, a stationary guide on which rides a groove cut into and along the bottom of the sliding frame, a groove in the threshold or sill and several horizontally rotatable wheels attached to the bottom of the frame and ride along the upright walls of the groove or similar mechanisms.

A bottom rolling apparatus consists of two or more rollers at the bottom of the frame which run on a track and a guide at the top which runs, for example, in a guide channel cut into the frame casing or header.

The above described sliding gear mechanisms have several drawbacks such as, for example, friction between the wheels and the track which increases the amount of force required to slide the frame back and forth. Another drawback is the sensitivity of these mechanisms to dust or debris which may be trapped either in the wheel axes or in the track impeding the wheels, preventing them from running smoothly and requiring periodical maintenance such as lubrication, cleaning and occasionally replacement of worn wheels.

Additionally, the above described sliding gear mechanisms are also affected by manufacturing imperfections, for example, imperfection of the rail such as a slightly curved track or minor protrusions or grooves along the riding track of the rail which may prevent the wheeled gear mechanism from running smoothly.

Several attempts have been made to develop reduced friction frame sliding gear mechanisms employing materials such as Teflon®, semi-frictionless frame sliding gear mechanisms employing magnets and wheels or contactless mechanism employing magnets alone.

Contactless, and frictionless magnet-based sliding gear mechanisms rely on the repelling forces which develop between two adjacent magnets, one located in the base of the frame and the second in the threshold or sill and having the same magnetic field orientation to overcome gravity and allow suspension of the frame in mid-air. The advantage of such mechanisms primarily lies in them being maintenance free having no moving parts such as wheels.

As in the mounted or suspended sliding frame gear mechanisms, contactless, magnet-based sliding gear mechanisms also require lateral stabilization of the frame to prevent it from swinging or deviating sideways. Attempts have been made to meet this requirement. Such attempts involve complex series of magnets vertically placed on the lateral aspects of the frame bottom or top aspects and along the vertical walls of a groove in the threshold or sill or in the header. Other attempts involve grooves and guides similar to those described above and other similar mechanisms.

The present apparatus and method present a simple and maintenance-free contactless and frictionless frame sliding gear mechanism, which is designed to continuously maintain an equilibrium between forces acting on the sliding frame at any point along the path of translation of the frame. This not only provides a solution for preventing the frame from swinging or deviating sideways, both in a stationary position as well as during translation, but also ensures smooth, unhindered translation of the frame, regardless of its spatial orientation.

SUMMARY

The current method and apparatus seeks to provide a support apparatus for a sliding frame that includes a stationary portion and a movable portion slidingly movable over the stationary portion along a path of translation.

The movable portion and the stationary portion each include a pair of angled-walls and permanent magnetic inserts oriented to generate a repelling force and maintaining a single state of contactless equilibrium between the stationary portion and the movable portion at any point throughout said path of translation regardless of the orientation of the plane defined by the frame.

In an embodiment of the current method and apparatus the frame also includes a T-shaped edge, opposing and parallel to the movable portion.

In yet another embodiment of the current method and apparatus there is provided a hanging sliding frame support apparatus.

In still another embodiment of the current method and apparatus there is provided a sliding frame supported by two support apparatuses located at opposite edges of the frame and in parallel to each other.

In another embodiment of the current method and apparatus a sliding frame is supported by two support apparatuses and attached by brackets or hinges so that to provide freedom in selecting the angle at which the frame is tilted.

In yet another embodiment of the current method and apparatus a sliding frame in a horizontal orientation is supported by two or more support apparatuses, which provide a fully contactless, frictionless, "floating", horizontally sliding frame.

In still another embodiment of the current method and apparatus the stationary portion may have a circular cross-section and a tube-like form into which are inserted one or more magnetic inserts.

The movable portion may have a crescent-like cross-section including one or more magnetic inserts also having a crescent-like cross-section or be itself a magnet. This embodiment allows a limited degree of tolerance for minor rotating of the movable portion about the stationary portion separately from or together with the frame.

In another embodiment of the current method and apparatus the support apparatus for a sliding frame also includes one or more ferromagnetic debris collecting magnets. Such debris may be present in house dust or in an industrial environment where such a sliding frame support apparatus may be installed. The support apparatus having ferromagnetic debris collecting magnets and no mechanically contacting moving parts is unaffected by accumulation of reasonable amounts of household dust and debris and is thus maintenance free.

In yet another embodiment of the current method and apparatus, stationary portion magnetic inserts may be segmented having gaps between segments designed to slow down or effect stepwise movement of the movable portion.

BRIEF DESCRIPTION OF THE DRAWINGS

The present method and apparatus will be understood and appreciated from the following detailed description, taken in conjunction with the drawings and wherein like reference numerals denote like elements.

DETAILED DESCRIPTION

For the purpose of this disclosure the term "Frame" as used in this disclosure means any construction defining a single plane.

The term "Single Plane" as used in this disclosure includes a plane having a thickness and/or comprising one or more adjacent layers of material generally parallel to each other and enclosed by a single frame.

The terms "Sliding" and "Slidingly" as used in this disclosure mean contactless and frictionless movement along a surface, wherein the movement may be smooth or in a stepwise fashion.

The terms "Magnetic Inserts", "Permanent Magnetic Inserts", "Inserts" and "Magnets" as used in this disclosure are used interchangeably and mean permanent magnetic inserts.

Figure 1A:
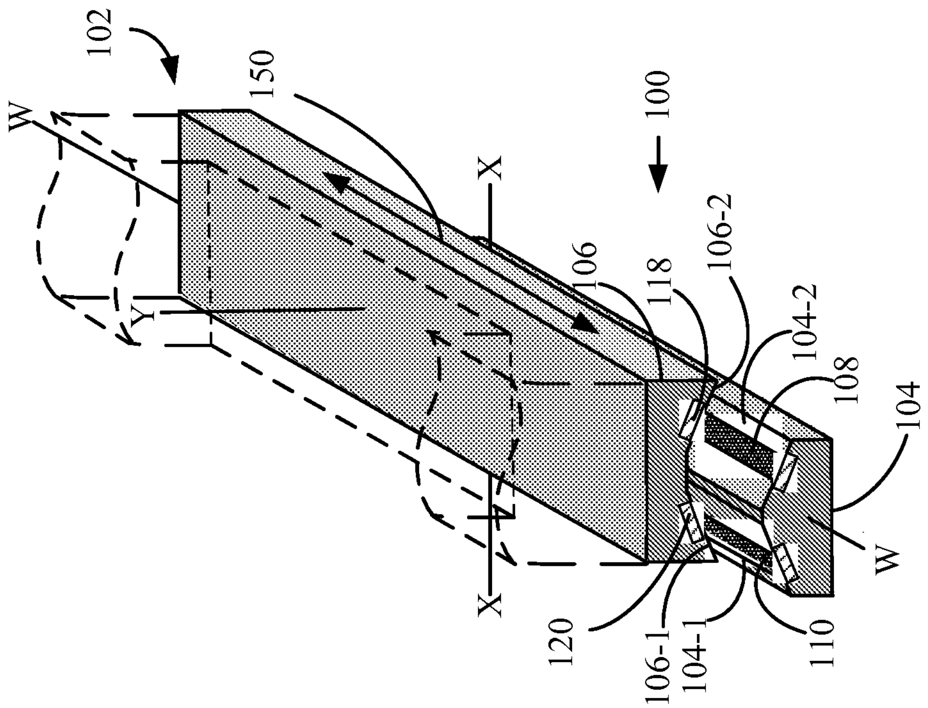
FIGS. 1A, 1B and 1C are elevated oblique view and cross-section view simplified illustrations of exemplary embodiments of a sliding frame support apparatus in accordance with the current method and apparatus.

Referring now to FIG. 1A, which is an elevated oblique view simplified illustration of an exemplary embodiment of the current method and apparatus. FIG. 1 illustrates a support apparatus 100 for a sliding frame 102 that includes a stationary portion 104 having a long axis W-W parallel to a plane defined by the frame and one or more permanent magnetic inserts 108/110 disposed along long axis W-W and defining a path of translation. A movable portion 106 of sliding frame 102 may also include one or more permanent magnetic inserts 118/120 having the same magnetic field vector orientation as the magnetic field vector orientation of magnetic inserts 108/110 of stationary portion 104 generating a repelling force therebetween so that movable portion 106 may be slidingly and frictionlessly movable over stationary portion 104 along the path of translation parallel to axis W-W in directions indicated by an arrow designated reference numeral 150. In this example, stationary portion 104 and frame movable portion 106 each include a pair of angled-walls, 104-1 and 104-2 in stationary portion 104 and 106-1 and 106-2 in movable portion 106. Each pair 104-1/104-2 and 106-1/106-2 forms an inverted V-type cross section which prevents dust and debris accumulation in support apparatus 100 and allows water runoff.

Wall pair 104-1/104-2 parallels corresponding wall pair 106-1/106-2. In this exemplary embodiment walls 104-1/104-2 and 106-1/106-2 may be equal in their dimensions and are tilted at an angle ($\alpha$) (FIG. 2B).

Permanent magnetic inserts 108 and 110 may be embedded in or laid upon the surface of stationary portion 104 and may be in parallel to and of equal dimensions as corresponding magnets 118 and 120 embedded in movable portion 106 of frame 102. The magnetic field vector of magnets 108 and 110 is the same as the magnetic field vector of corresponding magnets 118 and 120 so that adjacent poles of magnet pairs 108/118 and 110/120 have the same polarity generating a repelling force between the magnets embedded in stationary portion 104 and the magnets embedded in frame movable portion 106, as will be explained in detail below. Alternatively, magnetic inserts 108/110 and 118/120 may form an integral part of stationary portion 104 and movable portion 106 respectively.

Stationary portion 104 and/or movable portion 106 of frame 102 may themselves be made of a magnetic material.

In the embodiment described in FIG. 1, which is a sliding frame being in a vertical/upright orientation, an edge 402 (FIG. 4) of frame 102 opposing movable portion 106 does not require a significant sliding gear mechanism since in absence of friction the forces acting upon the edge are minimal as will be described below. Alternatively and optionally, the edge 402 of frame 102 opposing movable portion 106 as well as the frame stationary portion 404 (FIG. 4) may be made of a sliding mechanism identical in structure to support apparatus 100, as will be described in detail below.

Support apparatus 100 for a sliding frame 102 may also include a sliding frame locking apparatus.

Typically, magnets 108 and 110, embedded in stationary portion 104 would span most if not the entire length of stationary portion 104. Magnets 118 and 120 may be constructed from one or more segments of a ferromagnetic metal or composite or a rare earth alloy such as samarium-cobalt or neodymium. Corresponding magnets 118 and 120 embedded in movable portion 106 of frame 102 may partially or fully span the length of movable portion 106. For example purposes only, magnets 118 and 120 may each be constructed of two magnet segments each segment located adjacent to one end of movable portion 106.

Figure 1B:
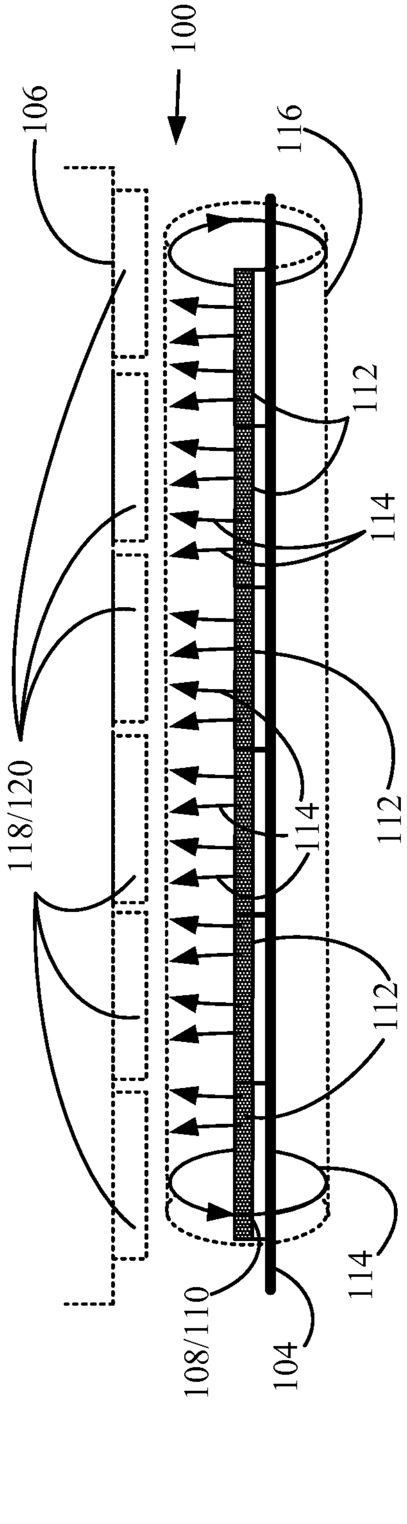
Figure 1C:
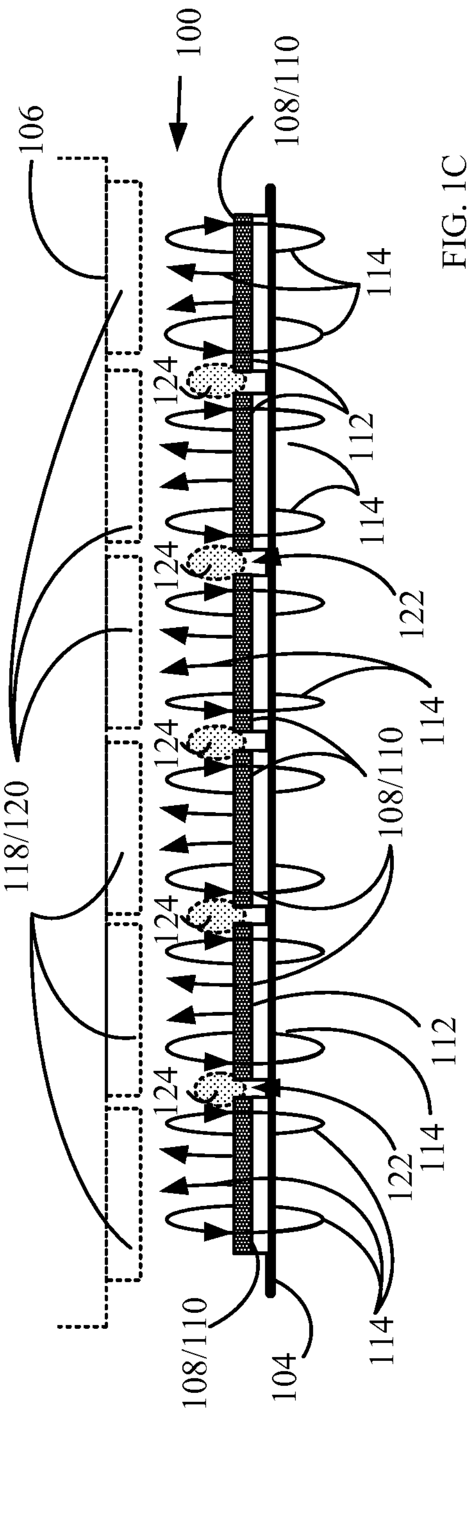

Referring now to FIGS. 1B and 1C, which are simplified cross-section view illustrations of two embodiments of support apparatus 100 of FIG. 1A taken along Axis W-W. As shown in FIG. 1B, segments 112 constituting magnet inserts 108/110 may be inserted along the path of translation in stationary portion 104 in a gapless manner so that to form a single contiguous magnet spanning the length of the path of translation. In this configuration magnetic fields 114 effected by each individual segment join to form a single continuous magnetic field as indicated by a phantom-line cylinder 116. For illustration purposes only, magnetic fields not contributing to the forces discussed throughout the text have been omitted.

A continuous magnetic field spanning stationary portion 104 allows for a smooth, frictionless translation of movable portion 106 along the path of translation which requires minimal effort to effect.

FIG. 1C depicts a segmented magnetic insert 108/110 having a plurality of gaps 122 between segments 112. Gaps 122 break the continuity of continuous magnetic field 116 into separate individual magnetic fields 114 and generate local disturbances in between magnetic inserts 108/110 segments and magnetic fields 114 in the force and direction of the magnetic field as graphically symbolized by phantom-line circles 124. Local magnetic field disturbances 124 may affect repelling forces that may act in a direction other than parallel to the path of translation and hinder smooth translation of movable portion 106 and effect a stepwise or "ratchet-effect"—like translation of movable portion 106 over stationary portion 104.

Additionally, the repelling forces effected by magnetic field disturbances 124 may be effected in a direction opposite and parallel to the direction of translation of movable portion 106 thus slowing down the speed of translation thereof. Alternatively and optionally, the size of the gaps may be altered at specific locations along the path of translation (e.g., near either end of the path) thus slowing down the translation of the frame in a frictionless manner as the frame reaches the end of the path thus acting like contactless magnetic dampers.

The magnitude of the repelling forces effected by magnetic field disturbances 124 depends on the size of gaps 122 and may therefore be controlled by varying the size of gaps 122 to achieve a desired translation speed and/or degree of stepped translation of movable portion 106 over stationary portion 104.

The number of segments 112 per area and their distribution along the edge of movable portion 106 may be calculated and determined in accordance with the weight of frame 102.

Figure 2A:
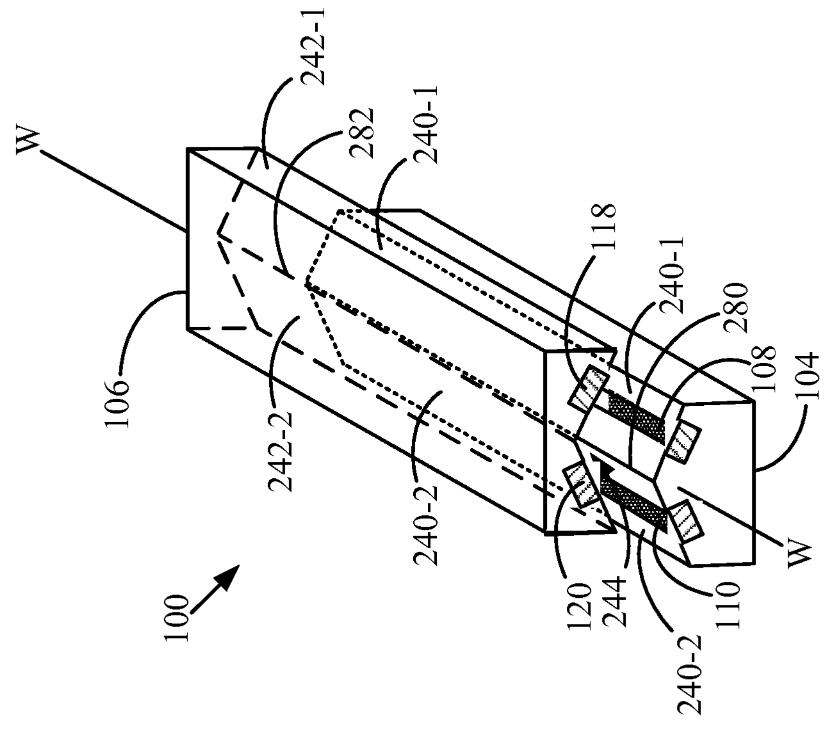
FIG. 2A is an elevated oblique view simplified illustration of an exemplary embodiment of a sliding frame support apparatus in accordance with the current method and apparatus.
Figure 2B:
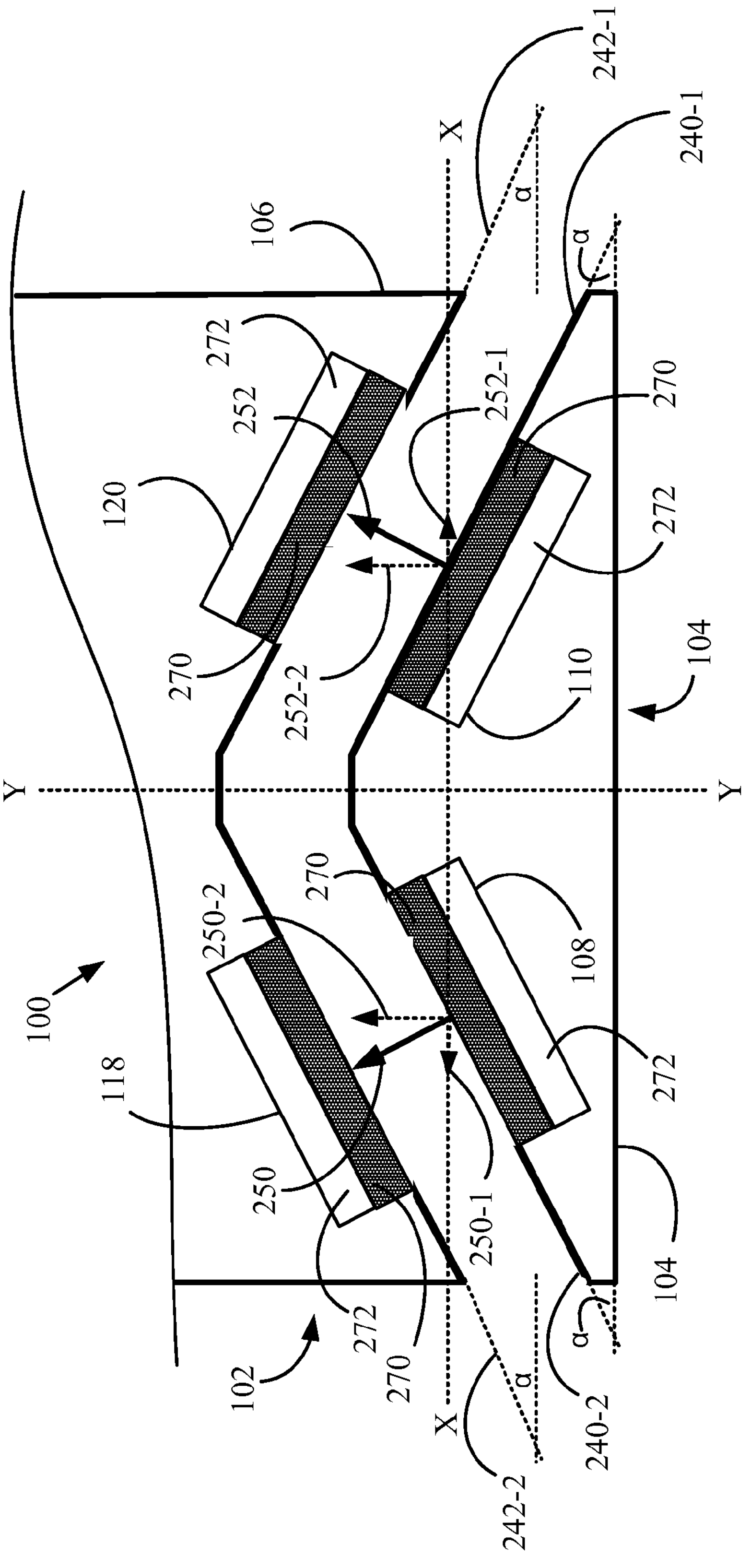
FIGS. 2B, 2C and 2D are cross-section view simplified illustrations of embodiments of the sliding frame support apparatus of FIG. 1.

Reference is now made to FIG. 2A which is an elevated oblique view simplified illustration of an exemplary embodiment of the current method and apparatus similar to that depicted in FIG. 1A. Stationary frame portion 104 may include two or more planes 240-1/240-2 each oriented along at least a portion of the length of frame portion 104 at an angle to each other and sharing an intersection line 280. Permanent magnetic inserts 108/110 may be attached to each of planes 240-1/240-2. Movable frame portion 106 may include a groove 244 spanning at least a portion of the length of portion 106 formed by at least two planes 242-1/242-2 each oriented in parallel to a corresponding plane located in the stationary portion 104 and forming an intersection line 282.

Permanent magnetic inserts 118/120 may be attached to each of the two planes 242-1/242-2 of moveable portion 106 wherein line 280 formed by the intersection of the planes 240-1/240-2 located in stationary frame portion 104 and line 282 formed by the intersection of the planes 242-1/242-2 located in moveable portion 106 are parallel to each other and in the same vertical plane. Line 280 is longer than or equal to line 282 and both lines are maintained parallel to each other and in the same plane parallel to a path of translation during translation of said sliding frame.

Figure 2C:
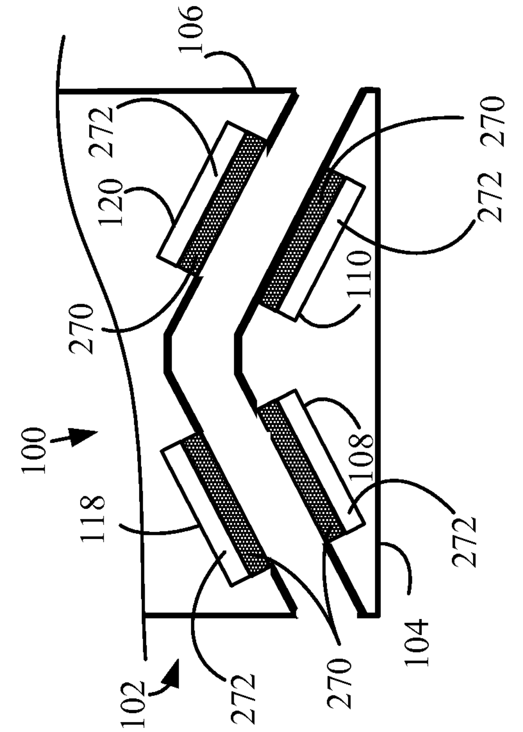
Figure 2D:
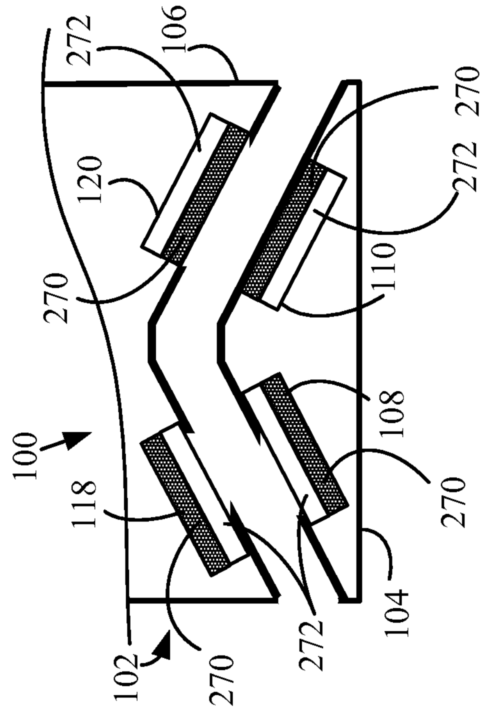

Reference is now made to FIGS. 2B, 2C and 2D, which are cross-section view simplified illustrations of embodiments of the support apparatus 100 for a sliding frame 102 shown in FIG. 1A and taken along axis X-X.

As shown in FIGS. 2B, 2C and 2D, permanent magnetic inserts 118/120/108 and 110 each include a first magnetic pole (North or South) indicated by a grey area 270 and a second, opposite magnetic pole (South or North) indicated by a white area 272. Inserts sharing the same frame portion (e.g., movable portion 106 or stationary portion 104) need not necessarily have the same polarity orientation. As shown in FIG. 2C, which is an embodiment in accordance with the current method and apparatus, inserts 118 and 120 are arranged to have the same polarity orientation. Accordingly, respective permanent magnetic Inserts 108 and 110 are also arranged to have the same polarity orientation.

As shown in FIG. 2D, which is another embodiment in accordance with the current method and apparatus, inserts 118 and 120 are arranged to have opposite polarity orientations. Accordingly, respective permanent magnetic inserts 108 and 110 are also arranged to have opposite polarity orientations.

As described in FIG. 1, Movable portion 106 of frame 102 slidingly translates over stationary portion 104 along axis W-W (FIG. 1) in a frictionless manner. Magnets 108 and 110 in stationary portion 104 are in parallel and have the same magnetic field vector as corresponding magnets 118 and 120 embedded in movable portion 106 of frame 102.

The magnetic field vector orientation of permanent magnetic inserts 108 and 118 creates a repelling force between magnet pair 108 and 118 expressed by a vector indicated by an arrow designated reference numeral 250. The value of vector 250 may be resolved in the XY plane and its components 250-1 and 250-2 parallel to the X and Y axes may be determined.

The magnetic field vector orientation of permanent magnetic inserts 110 and 120 creates a repelling force expressed in FIG. 2B by a vector 120 indicated by an arrow designated reference numeral 252 between magnet pair 110 and 120. The value of vector 252 may be resolved in the XY plane and its components 252-1 and 252-2 parallel to the X and Y axes may be determined.

In this exemplary embodiment, designed for a sliding frame in a vertical or upright orientation, walls 104-1/104-2 and 106-1/106-2 (FIG. 1) are equal in their dimensions and are tilted at an angle ($\alpha$). Magnets 108 and 110, embedded in stationary portion 104, are in parallel to and of equal dimensions as corresponding magnets 118 and 120 embedded in movable portion 106 of frame 102 and tilted at an angle (α). As a result a state of contactless equilibrium is created: the forces expressed by vectors 250 and 252 are equal. The force expressed by vector component 250-1 is equal and in opposite direction to the force expressed by vector component 252-1 laterally stabilizing frame 102 movable portion 106.

Furthermore, in light of permanent magnetic inserts 108, 110, 118 and 120 being oriented at an angle and the aforementioned description it will be appreciated that the current apparatus is designed to maintain continuous contactless frictionless equilibrium along the path of translation by, among others, laterally stabilizing movable portion 106. This lateral stability is maintained, for example, by creating a repelling force between magnetic insert pairs 108/110 and 118/120 opposing and equal to a force of disturbance which may develop in a direction, for exemplary purposes only, normal to the path of translation acting to divert sliding portion 106 from the path of translation.

In other words, the repelling forces generated by permanent magnetic insert pairs 108/110 and 118/120 both in a stationary and translational mode are effected opposite to and equal forces acting in directions other than parallel to the path of translation. This increases the smoothness of frictionless or almost frictionless translation and lessens the level of force required to slide frame 102 movable portion 106 over stationary portion 104.

The force expressed by vector component 250-2 is equal to and acts in concert with the force expressed by vector component 252-2 opposite in direction and potentially greater than or equal to the force of gravity acting on frame 102 thus creating an elevational force distancing frame 102 movable portion 106 from stationary portion 104. This state of contactless equilibrium is maintained at each and every point along path of translation 150 of frame 102 over stationary portion 104 regardless of the orientation of a plane defined by frame 102 as will be explained in more detail below.

In summary, the repelling forces generated within support apparatus 100 maintain a single state of contactless equilibrium between stationary portion 104 and movable portion 106 at any point throughout the path of translation regardless of the orientation of the plain defined by frame 102. Moreover, a plurality of points each being at the state of contactless equilibrium of the above described forces form a singular line of equilibrium in 3D space parallel to the path of translation.

Figure 2E:
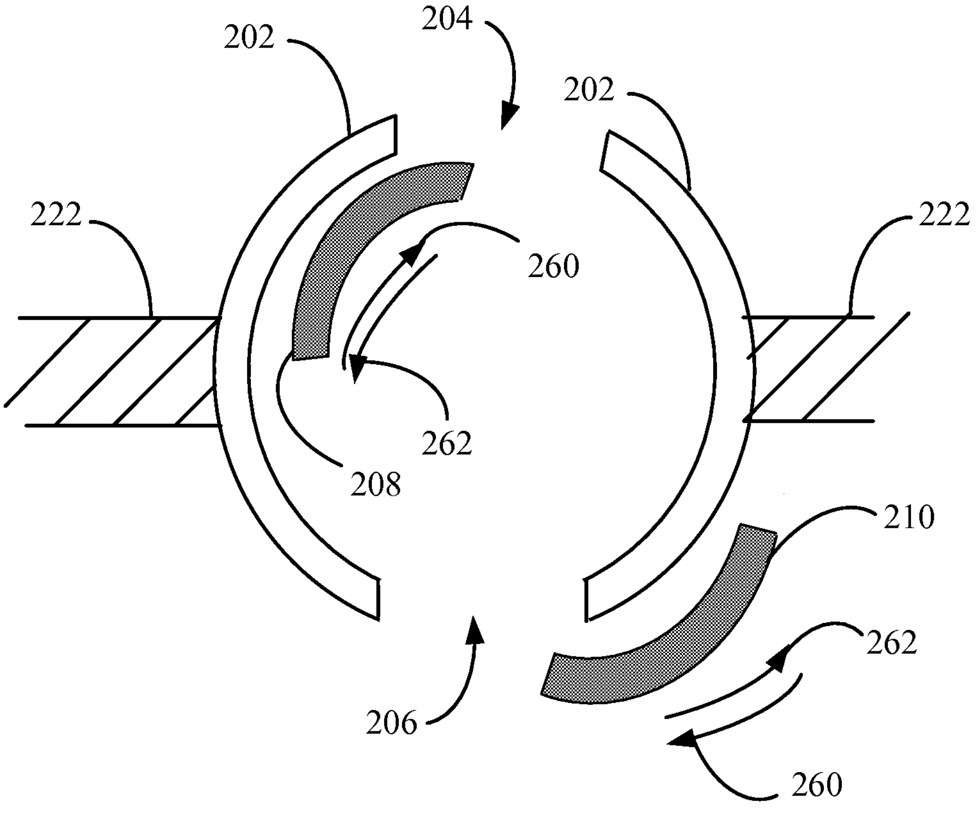
FIG. 2E is a simplified cross-sectional view illustration viewed from above of another exemplary embodiment of a sliding frame support apparatus in accordance with the current method and apparatus.

Such a line may not only be straight forming a straight path of translation, but may also be curved so that to form a curvilinear path of translation. As shown in FIG. 2E, which is a simplified cross-sectional illustration, viewed from above of another embodiment of a sliding frame support apparatus depicting a rotatable sliding frame. The curvilinear sliding frame path of translation may be circular such as that of a rotatable sliding entrance door or a shower stall sliding door.

FIG. 2E depicts a round static enclosure 202 set within a wall 222 having openings 204 and 206. Sliding frame 208, internal to static enclosure 202 may slide clockwise, as indicated by arrow 260 to close opening 204 after which frame 208 may slide counter-clockwise, as indicated by arrow 262 to open opening 204.

Similarly, sliding frame 210, external to static enclosure 202 may slide clockwise, as indicated by arrow 260 to close opening 206 after which frame 210 may slide counter-clockwise, as indicated by arrow 262 to open opening 206.

Such a curvilinear translation path system may employ a fully contactless, frictionless "floating" sliding frame apparatus with enhanced lateral stability such as that depicted in FIG. 6 below.

As described above, permanent magnet inserts 108, 110, 118 and 120 may be segmented. The surface area or number of segments per area of each of permanent magnetic inserts 108, 110, 118 and 120, their corresponding locations in movable portion 106 of frame 102 and stationary portion 104 and the angle (α) at which they are placed is dependent on the dimensions and mass of the frame. The following is an exemplary table, experimentally derived by applicants, of the effect of changes in the angle (α) on the ratio between the magnitude of vector components 250-1, 250-2 and the magnitude of vector components 252-1 and 252-2 expressing the magnitude of the corresponding repelling forces generated between magnetic insert pairs 108/110 and 118/120 measured for a 14 kg frame:

| Angle (α) (Degrees) | Magnitude of Vectors 250-2/252-2 (Kg) | Magnitude of Vectors 250-1/252-1 (Kg) |
|---|---|---|
| 8 | 14 | 1.95 |
| 12 | 13.8 | 2.91 |
| 16 | 13.6 | 3.9 |
| 21 | 13.2 | 5 |
| 25 | 12.8 | 5.91 |
| 30 | 12.3 | 7 |
| 34 | 11.7 | 8 |
| 40 | 10.8 | 9 |
| 45 | 10 | 9.9 |

Figure 3A:
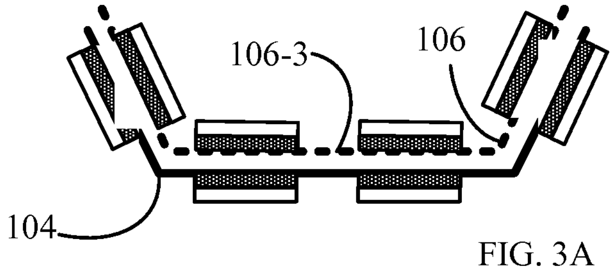
FIGS. 3A, 3B and 3C are cross-section view simplified illustrations of exemplary configurations of the sliding frame support apparatus shown in FIG. 1 in accordance with the current method and apparatus.
Figure 3B:
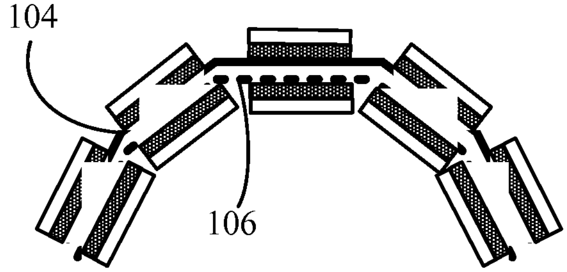
Figure 3C:
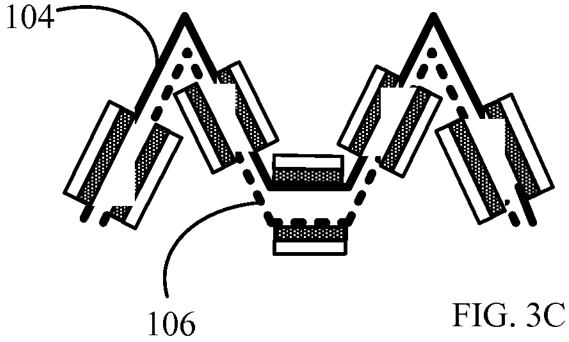

Reference is now made to FIGS. 3A, 3B and 3C, which are cross-sectional simplified illustrations of exemplary configurations of the support apparatus for a sliding frame shown in FIG. 1 in accordance with the current method and apparatus. FIG. 3A shows a triple-walled groove one wall 106-3 being horizontal. This type of configuration provides an increased elevational force, further contributing to forces expressed by vector components 250-2 and 252-2, of frame 102 as described above. FIG. 3B illustrates a multiple angled-wall configuration. It will be appreciated by persons skilled in the art that the number of angled walls may vary and may be increased to provide a crescent-like appearance as will be described in greater detail below. FIG. 3C shows a double-grooved configuration of the support apparatus for a sliding frame. This configuration provides greater vertical support as well as greater lateral stability of the frame by providing a double path of translation. This configuration may include two or more grooves as necessary to further increase lateral stability.

Stationary portion and said movable portion may have a cross-section selected from either a group of geometrical shapes such as a circle, a crescent, a triangle and a quadrangle or a group of letters of the alphabet such as a "V", an inverted "V", a "W", an inverted "W", a "U" and an inverted "U".

Figure 4:
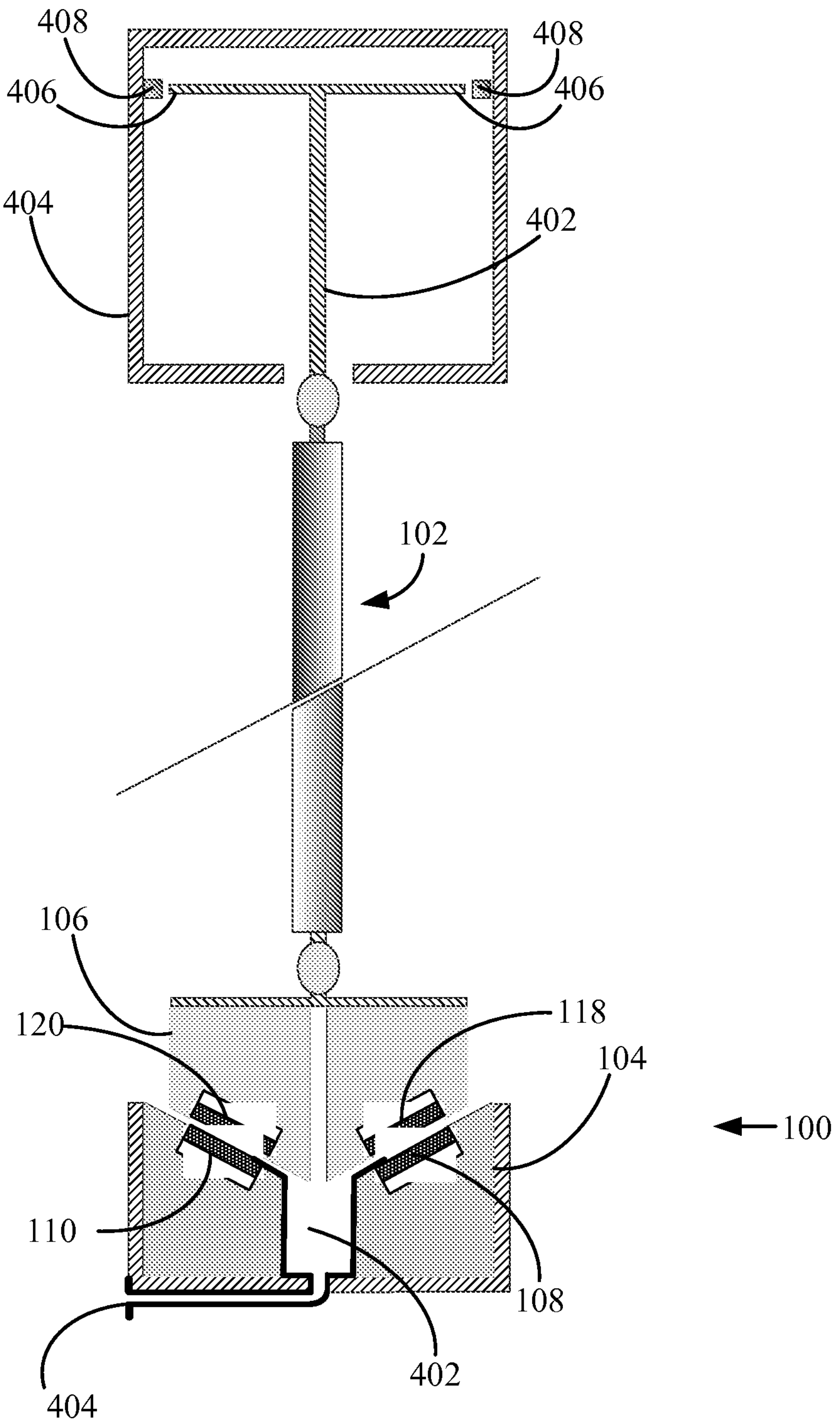
FIG. 4 is a cross-section view simplified illustration of an exemplary embodiment of a sliding frame support apparatus in accordance with the current method and apparatus.

Some configurations of the support apparatuses for a sliding frame such as those shown in FIGS. 3A and 3C may also include a fluid collection basin (402, FIG. 4) and draining outlet (404, FIG. 4).

Referring now to FIG. 4, which is a cross-section view simplified illustration of an exemplary embodiment in accordance with the current method and apparatus. In FIG. 4 frame 102 is supported by a single support apparatus 100 included in stationary portion 104 and a frame movable portion 106. As described above support apparatus 100 provides both elevational support (FIG. 2B, Vectors 250-2 and 252-2) as well as lateral stabilization (FIG. 2B, Vectors 250-1 and 252-1) of frame 102. In FIG. 4, frame 102 also includes also includes a T-shaped edge 402, opposing and parallel to the movable portion 106.

Both tips of the horizontal T arms 406 run against a stabilizing means 408 such as a brush, a plastic rail etc. The forces acting on edge 402 of frame 102 are minor hence minimal means for lateral stabilization are required if at all. Such means may include any type of mechanism described above. It will be appreciated that due to the enhanced lateral stabilization of frame 102 effected by support apparatus 100 only periodical contact, if at all, exists between tips of the horizontal T arms 406 and stabilizing means 408 throughout translation of frame 102.

Support apparatus 100 may also include one or more fluid collection basins 402 and draining outlets 404.

Figure 5:
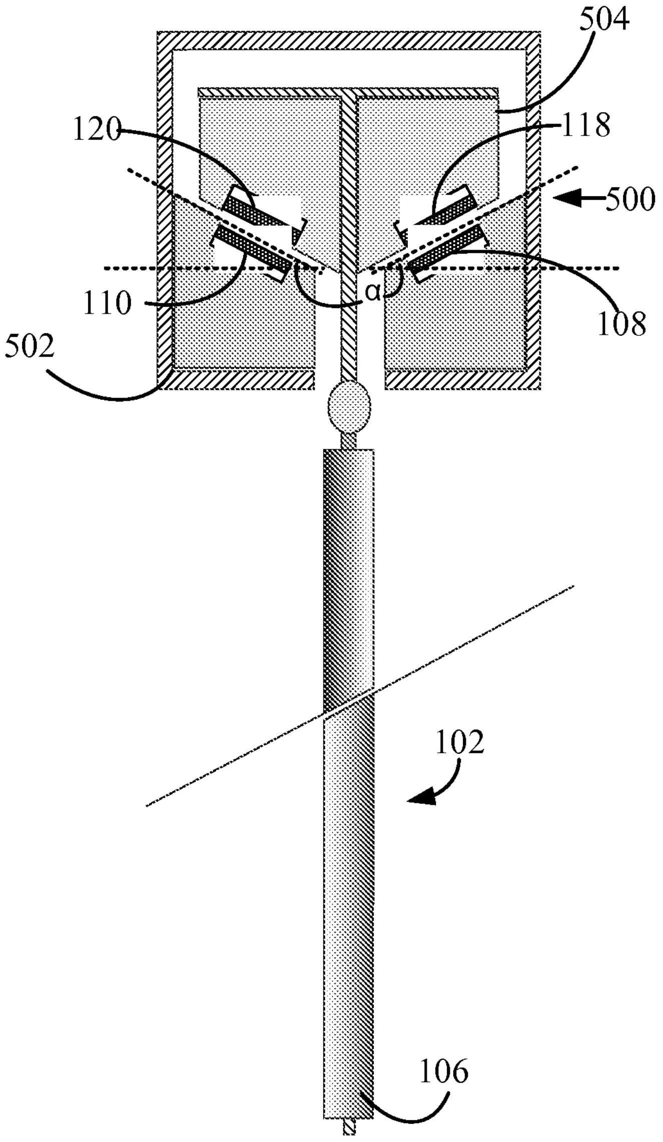
FIG. 5 is a cross-section view simplified illustration of another exemplary embodiment of sliding frame support apparatus in accordance with the current method and apparatus.

Reference is now to FIG. 5, which is a cross-sectional simplified illustration of another exemplary embodiment in accordance with the current method and apparatus. FIG. 5 illustrates a hanging apparatus 500 for a sliding frame 102 that includes a stationary portion 502 and a movable portion 504.

In this example, stationary portion 502 and a movable portion 504 each include a pair of angled-walls forming a V-type cross section.

Permanent magnetic inserts 108 and 110 are embedded in stationary portion 502, tilted at an angle to each other and at an angle ($\alpha$) relative to an axis normal to the plane defined by frame 102 and are in parallel to and of equal dimensions as corresponding permanent magnetic inserts 118 and 120 embedded in frame 102 movable portion 504. The magnetic field vector of permanent magnetic inserts 108 and 110 is the same as the vector of the magnetic field generated by corresponding permanent magnetic inserts 118 and 120 so that repelling forces develop between the permanent magnetic inserts embedded in stationary portion 502 and the permanent magnetic inserts embedded in frame 102 movable portion 504 as described in FIG. 2B above. Alternatively, stationary portion 502 and/or frame 102 movable portion 504 may themselves be made of a magnetic material.

Similar to support apparatus 100 and as described in FIG. 2 above, hanging apparatus 500 provides both elevational support (FIG. 2B, Vectors 250-2 and 252-2) as well as lateral stabilization (FIG. 2B, Vectors 250-1 and 252-1) of frame 102. In hanging apparatus 500 having a V-type cross section as opposed to an inverted V-type cross section shown in FIG. 2B above, vectors (not shown) corresponding to vectors 250-1 and 252-1 (FIG. 2B) are effected towards axis Y (FIG. 2B) and not away from axis Y as shown in FIG. 2B. Nonetheless, the lateral stabilization effected in the configuration shown in FIG. 5 is identical to that effected by vectors 250-1 and 252-1 (FIG. 2B).

The forces acting on movable portion 106 of frame 102 are minor hence minimal means for lateral stabilization are required if at all. Such means may include any type of mechanism described above and have been omitted in FIG. 5 for reasons of simplification.

Figure 6:
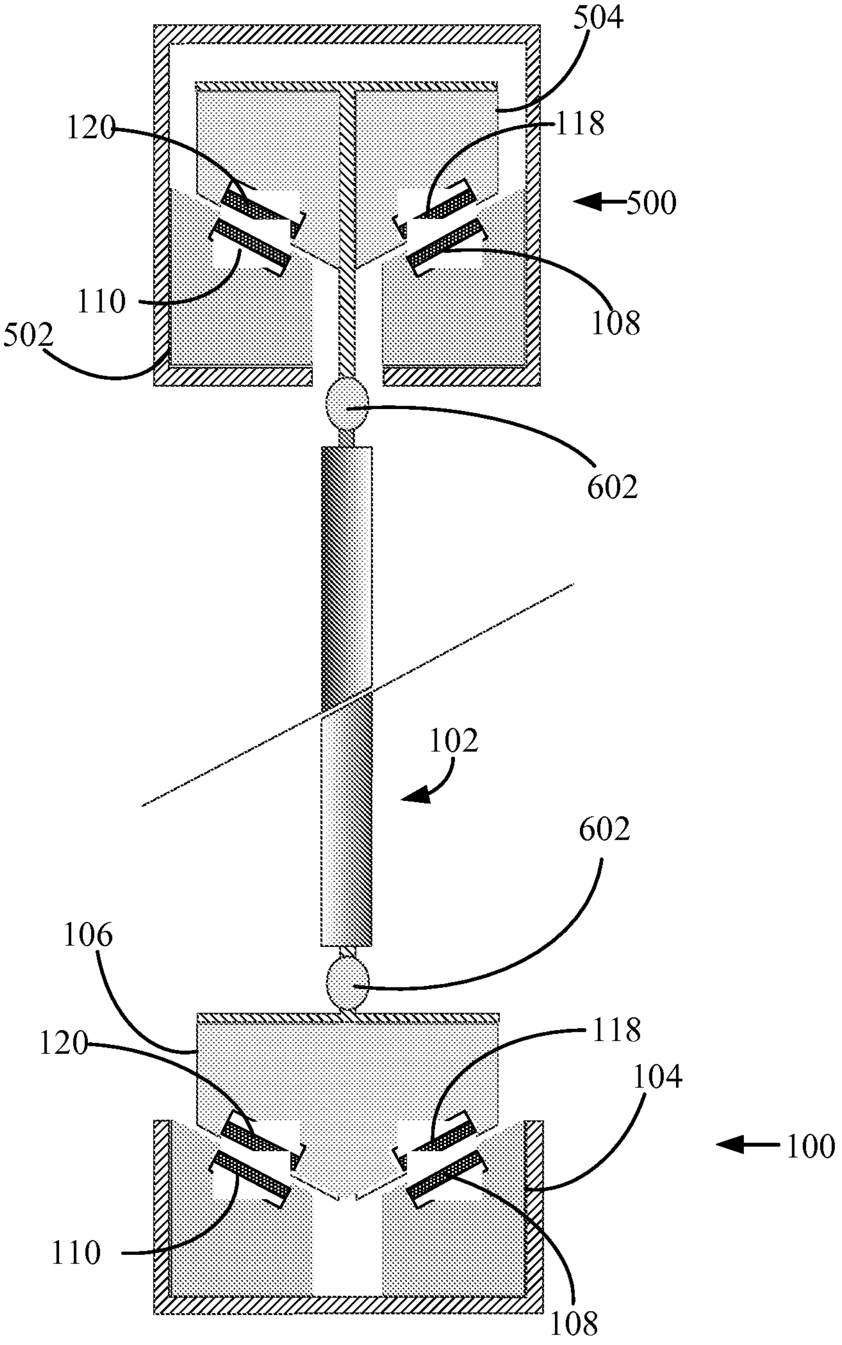
FIG. 6 is a cross-section view simplified illustration of yet another exemplary embodiment of a sliding frame support apparatus in accordance with the current method and apparatus.

In FIG. 6, which is a cross-section view simplified illustration of yet another embodiment in accordance with the current method and apparatus that combines the embodiments of FIGS. 4 and 5 to provide a fully contactless, "floating" sliding frame apparatus with enhanced lateral stability.

This embodiment may also include, when desired, one or more angled brackets, such as elbow brackets, or hinges 602 which provide freedom in selecting an angle of tilt of frame 102 as will be described below.

Figure 7:
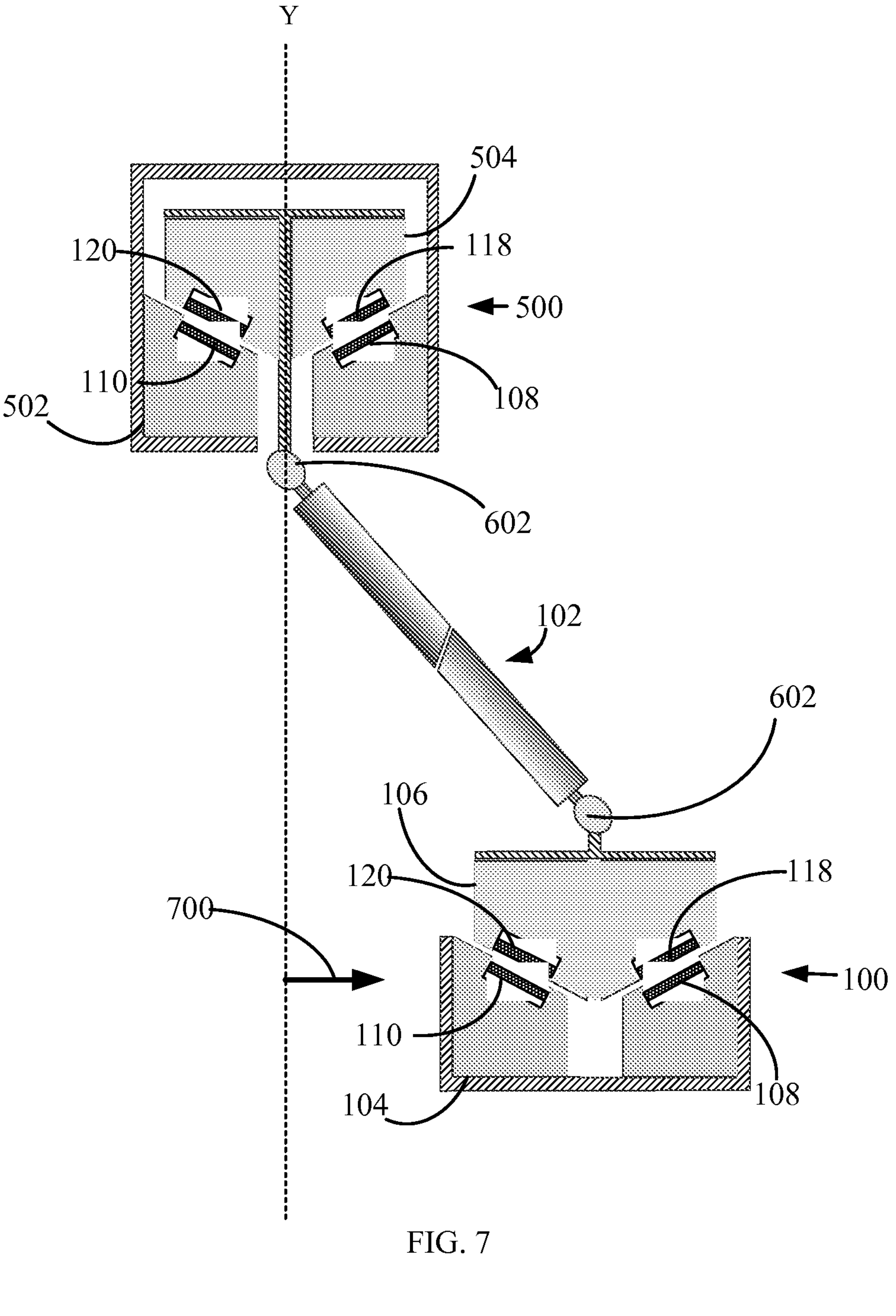
FIG. 7 is a cross-section view simplified illustration of a configuration of the embodiment of FIG. 6 in accordance with the current method and apparatus

FIG. 7 is a cross-section view simplified illustration of a configuration of the embodiment of FIG. 6 in accordance with the current method and apparatus. As shown in FIG. 7, support apparatus 100 is not located on the same axis Y as hanging apparatus 500 and is shifted from axis Y in a direction indicated by an arrow designated reference numeral 700. Brackets 602 may be set in an angle to accommodate the shift of support apparatus 100 thus allowing the tilting of frame 102. Alternatively, brackets 602 may be replaced by hinges to provide freedom in selecting the angle at which frame 102 is tilted.

Figure 8:
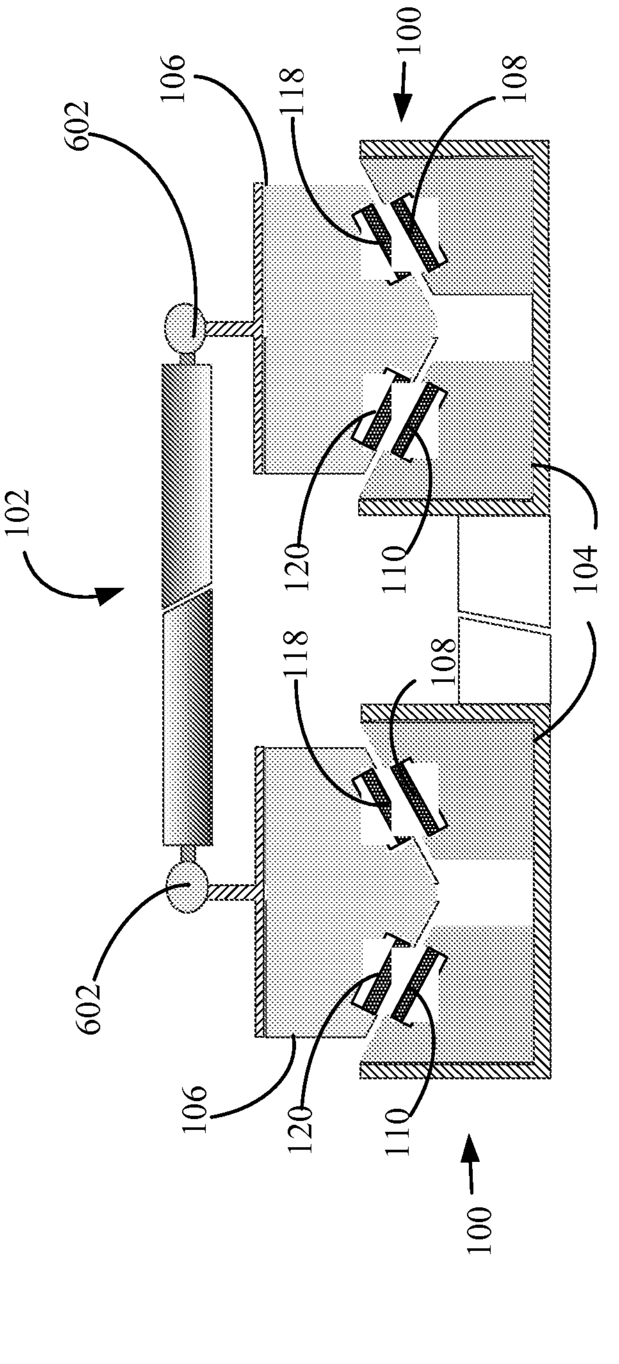
FIG. 8 is a cross-section view simplified illustration of still another exemplary embodiment of a sliding frame support apparatus in accordance with the current method and apparatus.

FIG. 8, which is still another embodiment of the current method and apparatus, illustrates a sliding frame in a horizontal orientation. Frame 102 is supported by two or more support apparatuses 100 which provide a fully contactless, "floating", horizontally sliding frame. Movable portions 106 may include brackets 602 set at a straight angle relative to the plane defined by frame 102. Alternatively, brackets 602 may be replaced by hinges to provide freedom in selecting the angle at which frame 102 is tilted.

In the configuration depicted in FIGS. 6, 7 and 8 frame 102 may be detachable from movable portion 106 and/or movable portion 504.

Figure 9A:
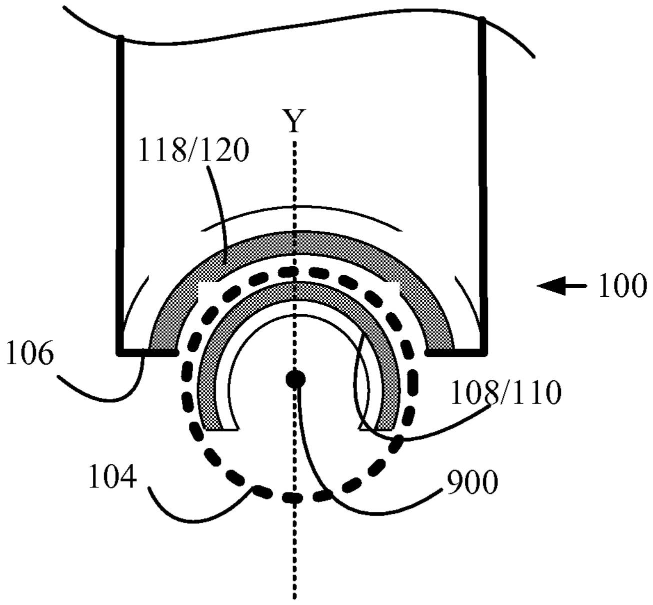
FIGS. 9A and 9B are cross-section view simplified illustrations of an exemplary embodiment of the sliding frame support apparatus employing the movable portion 106 configuration shown in FIG. 3B in accordance with the current method and apparatus.
Figure 9B:
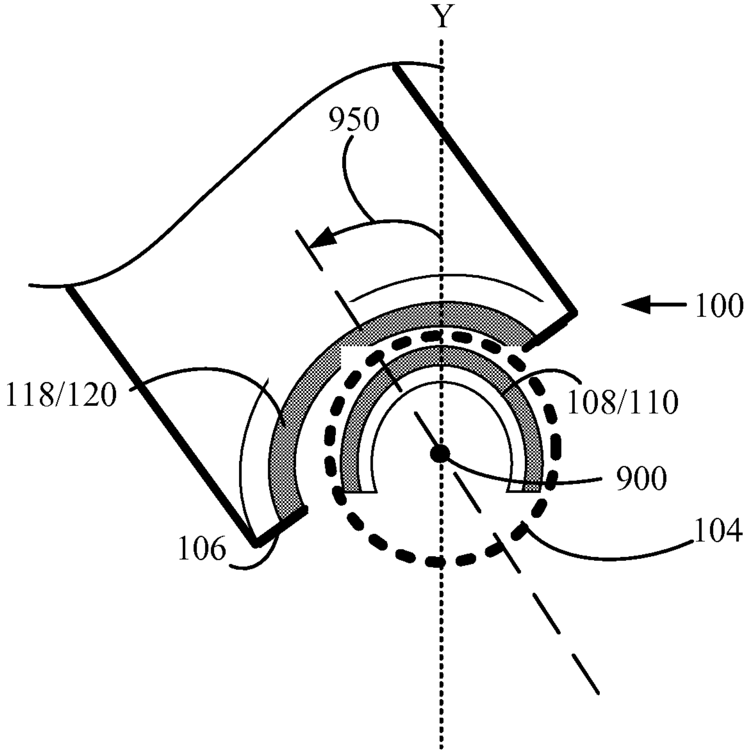

FIGS. 9A and 9B are cross-section view simplified illustrations of an exemplary embodiment employing the Movable portion 106 configuration similar to that shown in FIG. 3B in accordance with the current method and apparatus. In this embodiment, stationary portion 104 may have a circular cross-section and a tube-like form into which are inserted one or more magnetic inserts 108/110.

Movable portion 106 may have a crescent-like cross-section including a magnetic insert 118/120 also having a crescent-like cross-section.

In this embodiment, a limited degree of tolerance is allowed for minor rotating of movable portion 106 about stationary portion 104 separately from or together with frame 102. FIG. 9A indicates stationary portion 104 concentrically aligned with movable portion 106 around a center 900 along an axis Y. As shown in FIG. 9B, movable portion 106, being concentrically aligned has slightly rotated about center 900 in a direction indicated by arrow designated reference numeral 950.

Figure 10A:
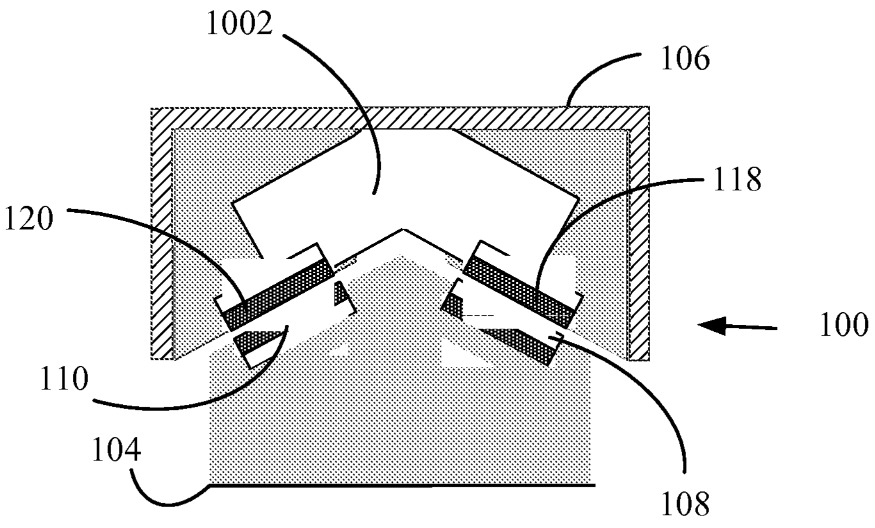
FIGS. 10A and 10B are simplified cross-section view illustrations of another exemplary embodiment of support apparatus 100 in accordance with the current method and apparatus.
Figure 10B:
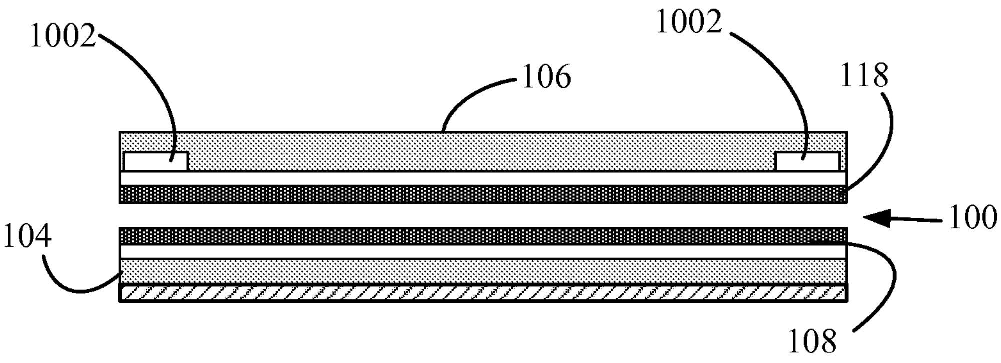

Reference is now made to FIGS. 10A and 10B, which are simplified cross-section view illustrations of another embodiment of support apparatus 100 in accordance with the current method and apparatus. FIG. 10A is a cross-section view illustration of support apparatus 100 of FIG. 1 taken along axis X-X. FIG. 10B is a cross-section view illustration of support apparatus 100 of FIG. 1 taken along axis W-W.

In the embodiment depicted in FIGS. 10A and 10B, one or more ferromagnetic debris collecting permanent magnetic inserts 1002 are optionally inserted at least at one end of movable portion 106. The magnetic field vector orientation of ferromagnetic debris collecting permanent magnetic inserts 1002 is the same as the magnetic field vector orientation of magnetic inserts 118/120 but the magnitude of magnetic field force of permanent magnetic inserts 1002 is significantly greater than that of magnetic inserts 118/120.

The magnetic field vector orientation of ferromagnetic debris collecting magnet 1002, magnetic inserts 108/110 disposed along said long axis of stationary portion 104 and of movable portion 106 magnetic inserts 118/120 are the same, generate repelling forces and maintain a single state of contactless equilibrium of the repelling forces between stationary portion 104 and movable portion 106 at any point throughout said path of translation regardless of the orientation of said plane.

The magnitude of permanent magnetic inserts 1002 and the magnetic field force effected thereby is sufficiently large so that ferromagnetic debris is attracted and adheres to permanent magnetic inserts 1002 as movable portion 106 translates over stationary portion 104.

Support apparatus 100 having ferromagnetic debris collecting permanent magnetic inserts 1002 and no mechanically contacting moving parts is unaffected by accumulation of reasonable amounts of household dust and debris and is thus maintenance free.

It will be appreciated by persons skilled in the art that the present invention is not limited to what has been particularly shown and described hereinabove. Rather, the scope of the invention includes both combinations and sub-combinations of various features described hereinabove as well as modifications and variations thereof which would occur to a person skilled in the art upon reading the foregoing description and which are not in the prior art.

What is claimed is:

1. A support apparatus for a sliding frame, said apparatus comprising:

a stationary portion having a long axis parallel to a plane defined by said frame and including at least one magnetic insert disposed along said long axis defining a straight or curved path of translation;

a movable portion fixedly or rotatively attached to said frame, including at least one magnetic insert and movable along said path of translation, wherein a magnetic field vector orientation of said at least one magnetic insert of said stationary portion and of said at least one magnetic insert of said movable portion are the same, and generate repelling forces and maintain a single state of contactless equilibrium of said repelling forces between said at least one magnetic insert of said stationary portion and said at least one magnetic insert of said movable portion at any point throughout said path of translation regardless of the orientation of said plane, wherein at least one side of said stationary portion includes at least two planes each oriented along at least a portion of a length of said at least one side of said stationary portion at an angle to each other and sharing an intersection line, wherein said at least one magnetic insert of said stationary portion is attached to each of said two planes of said at least one side of said stationary portion, and wherein at least one side of said movable portion includes a groove spanning at least a portion of a length of said at least one side of said movable portion, said at least one side of said movable portion includes at least two planes each oriented in parallel to a corresponding plane of said at least one side of said stationary portion, said at least two planes of said movable portion sharing an intersection line, wherein said movable portion includes at least one magnetic insert attached to each of said two planes of said movable portion; and wherein a line formed by the intersection of said two planes of said at least one side of said stationary portion and a line formed by the intersection of said two planes of said at least one side of said movable portion are parallel to each other and share in a same vertical plane.

2. The support apparatus according to claim 1, wherein a plurality of points each at said state of contactless equilibrium of said forces form a singular line of equilibrium in three-dimensional space parallel to said path of translation.

3. The support apparatus according to claim 1, wherein said at least one insert of said stationary portion are disposed along at least two surfaces oriented along said long axis and at an angle to each other, said at least one magnetic insert of said movable portion are disposed along at least two surfaces oriented parallel to said long axis, at an angle to each other, each corresponding and close to parallel to at least one of said at least two surfaces of said stationary portion throughout said path of translation.

4. The support apparatus according to claim 1, wherein said single state of contactless equilibrium is maintained by a repelling force effected by said magnetic inserts opposite and equal to a force of disturbance diverting said movable portion from said path of translation.

5. The support apparatus according to claim 1, wherein said magnet inserts are segmented.

6. The support apparatus according to claim 1, wherein said movable portion includes at least two magnetic insert segments.

7. The support apparatus according to claim 1, wherein said movable portion is rotatively attached to said frame via adjustable brackets or hinges.

8. The support apparatus according to claim 7, wherein a degree of tilt of said planes can be adjusted employing said brackets or hinges.

9. The support apparatus according to claim 1, wherein said frame is detachable from said movable portion.

10. The support apparatus according to claim 1, wherein said stationary portion has a circular cross-section and said movable portion has a crescent-like cross-section and is rotatable about said stationary portion.

11. The support apparatus according to claim 1, wherein said stationary portion and said movable portion have a cross-section selected from either a group of geometrical shapes such as a circle, a crescent, a triangle and a quadrangle or a group of letters of the alphabet such as a "V", an inverted "V", a "W", an inverted "W", a "U" and an inverted "U".

12. The support apparatus according to claim 1, wherein the line formed by the intersection of the two planes of said stationary portion is longer than or equal to the line formed by the intersection of the two planes of said movable portion.

13. The support apparatus according to claim 1, further comprising at least one fluid collection basin and draining outlet.

14. The support apparatus according to claim 1, further comprising a movable portion locking mechanism.

15. The support apparatus according to claim 1, wherein said line formed by the intersection of the two planes located in the stationary portion and the line formed by the intersection of the two planes located in the movable portion are maintained parallel to each other and in the same plane parallel to said path of translation during translation of said movable portion.

16. The support apparatus according to claim 1, further comprising:

at least one ferromagnetic debris collecting magnet inserted into at least at one end of said movable portion.

17. The support apparatus according to claim 16, wherein the magnitude of the a magnetic field force vector of said ferromagnetic debris collecting magnet is greater than that of said stationary portion and movable portion magnetic inserts and sufficiently large to attract and adhere ferromagnetic debris.

18. The apparatus according to claim 1, wherein said stationary portion and movable portion each include at least two magnetic inserts having a same polarity orientation.

19. The apparatus according to claim 1, wherein said stationary portion and movable portion each include at least two magnetic inserts located opposite to each other in their polarity orientations.

* * * * *